US009804872B1

United States Patent
Ozerov et al.

(10) Patent No.: US 9,804,872 B1
(45) Date of Patent: Oct. 31, 2017

(54) METHOD FOR EMULATION OF A VIRTUAL OS BOOKMARK ON A HOST DESKTOP

(71) Applicant: Parallels IP Holdings GmbH, Schaffhausen (CH)

(72) Inventors: Denis Ozerov, Moscow (RU); Andrey A. Omelyanchuk, Moscow (RU); Nikolay N. Dobrovolskiy, Moscow (RU); Stanislav S. Protassov, Moscow (RU); Serguei M. Beloussov, Singapore (SG)

(73) Assignee: PARALLELS INTERNATIONAL GMBH, Schaffhausen (CH)

( * ) Notice: Subject to any disclaimer, the term of this patent is extended or adjusted under 35 U.S.C. 154(b) by 209 days.

(21) Appl. No.: 14/558,769

(22) Filed: Dec. 3, 2014

(51) Int. Cl.
*G06F 9/455* (2006.01)
*G06F 3/0481* (2013.01)

(52) U.S. Cl.
CPC ...... *G06F 9/45545* (2013.01); *G06F 3/04817* (2013.01)

(58) Field of Classification Search
None
See application file for complete search history.

(56) References Cited

U.S. PATENT DOCUMENTS

| 8,972,977 | B2 * | 3/2015 | Neil | G06F 9/45533 718/1 |
| 2004/0158813 | A1 * | 8/2004 | Xia | G06F 8/60 717/116 |
| 2010/0180274 | A1 * | 7/2010 | Cherian | G06F 9/45558 718/1 |
| 2011/0251992 | A1 * | 10/2011 | Bethlehem | H04L 12/2863 707/610 |
| 2012/0110483 | A1 * | 5/2012 | Arcese | G06F 3/04817 715/768 |
| 2013/0167105 | A1 * | 6/2013 | Goldman | G06F 8/60 717/101 |

\* cited by examiner

*Primary Examiner* — Emerson Puente
*Assistant Examiner* — Steven Do
(74) *Attorney, Agent, or Firm* — Arent Fox LLP; Michael Fainberg

(57) ABSTRACT

A method, system and computer program product for emulation of a virtual application bookmark on a host desktop. When a user launches a VM (running Windows™), shortcuts to user applications are created on the desktop. In Parallels™ Desktop™, the VM shortcuts and MAC bookmarks can both be seen and be functional. A special file is created in MAC OS X with Windows™ icon. The file is associated with the VM from which the file was created, and resource link corresponding to the original shortcut. The bookmark thus contains a reference to an application icon in the VM, which the user can launch from the host OS by clicking on it.

17 Claims, 4 Drawing Sheets

METHOD FOR EMULATION OF A VIRTUAL OS BOOKMARK ON A HOST DESKTOP

BACKGROUND OF THE INVENTION

Field of the Invention

The present invention is related to Virtual Machines (VMs) and, in particular, to a method for displaying a VM application icon on a host desktop.

Description of the Related Art

Technological advances require users to have more than one operating system on their PCs. For example, having MAC OS X and Windows OS on the same computer system provides a user with the benefits of both worlds without having to reload the system. Therefore, it is desired to have a second operating system that can be loaded when necessary. Currently, Mac OS X has three most popular virtualization solutions: Parallels™ Desktop, VMware™ Fusion and VirtualBox™. The Parallels™ Desktop is the fastest and most convenient out of the three. All of the conventional solutions allow for creation of VMs without leaving Mac OS X. In other words, they create a Virtual Machine that has certain technical characteristics that can be configured based on users' preferences. For example, the VMs can have different memory capacity and different external devices. However, the VM uses part of resources of physical machine processor and part of the physical memory.

The coherence mode, available from Parallels™, is where MS Windows™ application windows (i.e., non-native windows, if the host OS is MAC) behave like Mac OS X windows. A border between the two running OSs becomes invisible. The files can be opened by both Windows and MAC applications. Native network capabilities of Mac OS X can be used in Windows. For example, if an active network connection exists in Mac OS X, all Windows™ applications can have network access as well.

Windows files can be accessed without launching Windows™ OS. Also, common directories can be accessed, and drag and drop capability is supported between both OSs. Use of VMs allows for simultaneous operations of Windows™ and MAC applications. There is no need to restart the computer for launching Windows applications. If the VM is create using Windows™ installed using Apple™ Boot Camp, any Windows applications can be launched easily. The VM provides for an access to files within both OSs.

However, use of the VMs has some disadvantages. The efficiency is lower compared to separate Windows OS installation. The VM takes up some capacity of the physical (host) machine and the hardware has to run two OSs: Mac OS X and Windows™ Thus, it is not possible to use a VM for resource-intensive video games.

The Windows icons' bookmarks are displayed on Mac OS X desktop with a different appearance than the one Windows™ users are accustomed to when the Windows™ is the main OS. When a user launches a VM (running Windows™ as a Guest OS), bookmarks (i.e., "shortcuts", in MS Windows terminology—the terms "bookmark" and "shortcut" are used interchangeably in this document) to user applications are created on the desktop. In Parallels™ Desktop, the VM desktop and MAC desktop are connected by default and the files can be seen in both. However, the bookmarks in Windows™ are seen as complex icons, with a specific graphical component and a path name to the executable file (created based on the bookmark data), but MAC displays them using a default file icon such as a white rectangle, and the path name, which points to the VM's file system, has no particular meaning the host MAC OS (along with any other data of the MS Windows shortcut). An attempt to activate the application to which such a "bookmark" points will fail.

Accordingly, it is desired to have a method for displaying bookmarks (shortcuts) of Windows™ applications in a usual form on a host desktop provided by MAC OS X, and to have them function as if they were native to the MAC OS.

SUMMARY OF THE INVENTION

The present invention is related to Virtual Machines (VMs) and, in particular, to a method for displaying a VM application icon on a host desktop that substantially overcomes the disadvantages of the related art.

According to an exemplary embodiment, a method, system and computer program for caching common file attributes of the VM is provided.

When a user launches a VM (running Windows™), bookmarks to user applications are created on the desktop. When the Parallels™ Desktop™ is running, the VM desktop and MAC desktop are synchronized by default and the files can be seen in both. The shortcuts in Windows™ are seen as graphic icons (created based on the shortcut data), but MAC displays them using default icons (often seen as white rectangles). According to an exemplary embodiment, this is addressed by a special file created in MAC OS X with the Windows™ icon. The Virtual Machine Monitor (VMM) associates the file with the VM from which the file was originally created (i.e., where the shortcut originally was intended to exist), and resource with the original bookmark is placed inside the file.

Thus, a wrapper (i.e., file inside the file) is created. Then, MAC OS X sees one entity and the VM can see the original bookmark (icon). A VM desktop has a bookmark in Windows™ format. The bookmark contains a reference to an application icon, which the bookmark can launch. When Windows™ OS sees the bookmark it reads all data and renders an icon to a user in a standard format with name, icon, etc. When the user clicks on the icon, the corresponding application is launched.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

Figure 1:
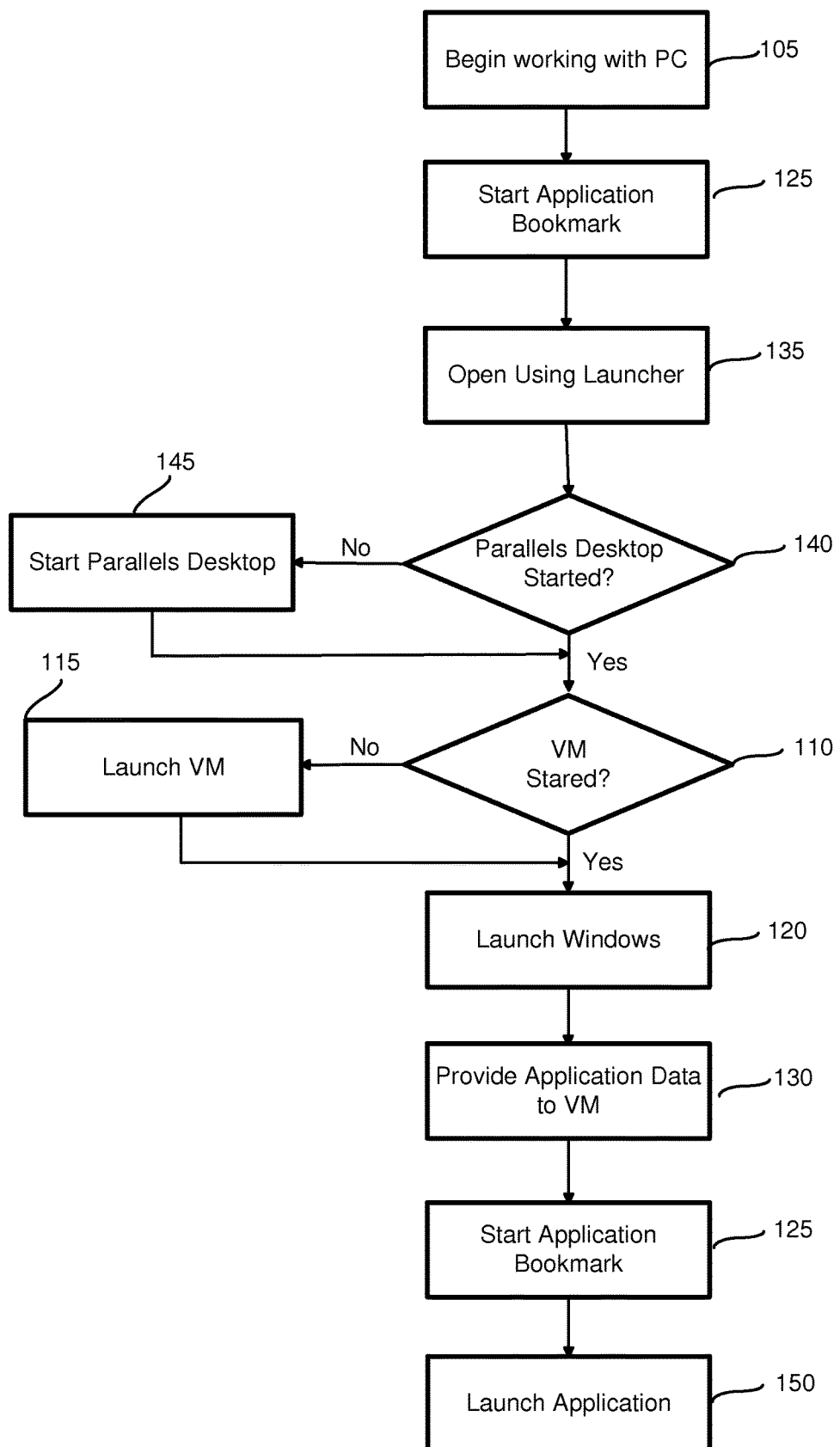
FIG. 1 illustrates a flow chart of a method, in accordance with the exemplary embodiment.

Reference will now be made in detail to the preferred embodiments of the present invention, examples of which are illustrated in the accompanying drawings.

When a user launches a VM (running, for example, Windows™), bookmarks (shortcuts) to user applications are created on the desktop. In a Parallels™ Desktop, the VM desktop and MAC desktop are synchronized by default and the files can be seamlessly seen as though only a single unified desktop is presented to the user. The bookmarks in Windows™ are seen as graphic icons (created based on the bookmark data), but MAC displays them using a default icon representation (i.e., as a white rectangles is some instances). According to an exemplary embodiment, this is addressed by a special file created in MAC OS X with Windows™ icon. The file is associated with the VM from which the file was created, and resource with the original bookmark is placed inside the icon file.

Thus, a wrapper (i.e., file inside the file) is created. Then, MAC OS X sees one entity and the VM can see the original bookmark (icon). The VM desktop maintains a bookmark in Windows™ format in the VM. The bookmark contains a reference to an application icon, which the bookmark can launch. When Windows™ OS sees the bookmark, it reads all data and renders a native icon to a user in a standard format with name, path name, icon image, etc. When the user clicks on the icon, the corresponding application is launched from the VM.

The icon is displayed in Windows™ native format (which, of course, is non-native to the MAC). The MAC OS X does not know anything about this icon and the icon would be shown as a white square. In order to make the icon visible on the MAC desktop in a usual format, the source icon file is placed inside another native file created by the MAC OS X. The source icon file references the non-native application inside the VM. When the bookmark is clicked on, the data is accessed through a reference (link). The launcher module launches the application. The launcher module takes a native file and retrieves the reference to Windows™ file and gets the information reflecting which VM is associated with this application. The launcher module checks if the Parallels™ Desktop is running on the host computer.

If the Parallels™ Desktop is not running, the launcher starts it up. Subsequently, the launcher sends instructions into a VM that has standard configurations that correspond to that shortcut. Thus, one shortcut is substituted by another one. Initially, the VM sees the substituted entity when it attempts to read the host desktop. However, virtualization is performed and the native file is substituted. Inside the VM, the process operates only with the Guest OS native file and does not see data reflecting the host icon and the link to the application. The host icon file can contain any number of resources, including the non-native source file of the VM, path, icon image, etc.

According to the exemplary embodiment, each time the VM wants to read or save some application link, and this link is about to be saved on the host, the link is automatically wrapped by a new wrapper file. Note that the bookmark represents a binary format containing references to icons, to external icons, and the bookmark can contain the non-native icons inside it. The bookmark can contain data indicating what to use for launching an application, the icon and data indicating the VM associated with the icon (since there could be multiple VMs running or instantiated on the system). Thus, the icon is taken from the internal format of the bookmark. The bookmark launcher parses the MAC bookmark and retrieves service data needed for launching the application corresponding to the bookmark.

According to the exemplary embodiment, when application creates a link (shortcut) on the host desktop, the system changes it to a stub file automatically, so it has a graphic representation of the icon and a name of the application.

FIG. 1 illustrates a flow chart of a method, in accordance with the exemplary embodiment. A user starts working with his PC in step 105. If a VM is running in step 110, Windows™ is launched on the VM in step 120. Otherwise, the VM is launched in step 115, prior to moving to step 120. In step 125, application bookmark is started. The application data is provided to the VM in step 130. The application is opened using launcher in step 135. The Parallels™ Desktop is started in step 145. Then, the application is launched in step 150.

Figure 2:
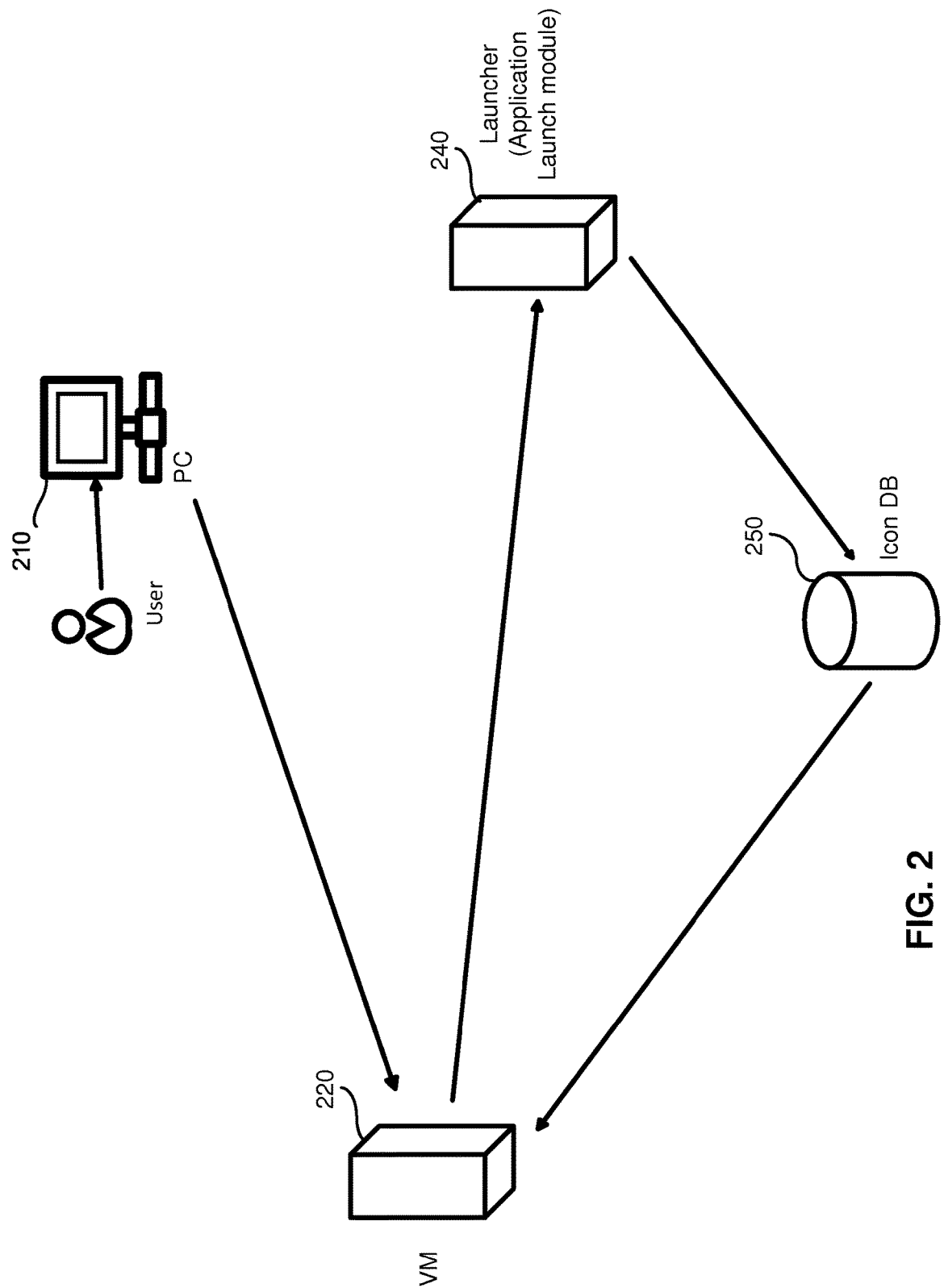
FIG. 2 illustrates a generic system architecture, in accordance with the exemplary embodiment.

FIG. 2 illustrates a generic system architecture, in accordance with the exemplary embodiment. Parallels™ Desktop is a control center for the VM. Therefore, Parallels™ Desktop is started first and then the VM 220 is launched.

A user PC 210 has a VM 220 running on it. The VM 220 communicates with an application launcher module 240. The launcher module 240 has an access to a database 250 containing native application icon data (i.e., icon image, path, the VM where the application resides, etc.). A user starts working with his PC 210. The VM 220 is running and MS Windows™ is launched on the VM 220. The application data is provided to the VM from MS Windows™ and the application is opened using the launcher module 240. If Parallels™ Desktop is running, an application file icon is virtualized on a host desktop 210 automatically when the Windows OS is launched on the VM. Then, the application is launched. Since the shared desktop is used, when the shortcut is activated, the virtualization of the application file icon on a host desktop 210 is intercepted and it is virtualized on the host desktop.

Figure 3:
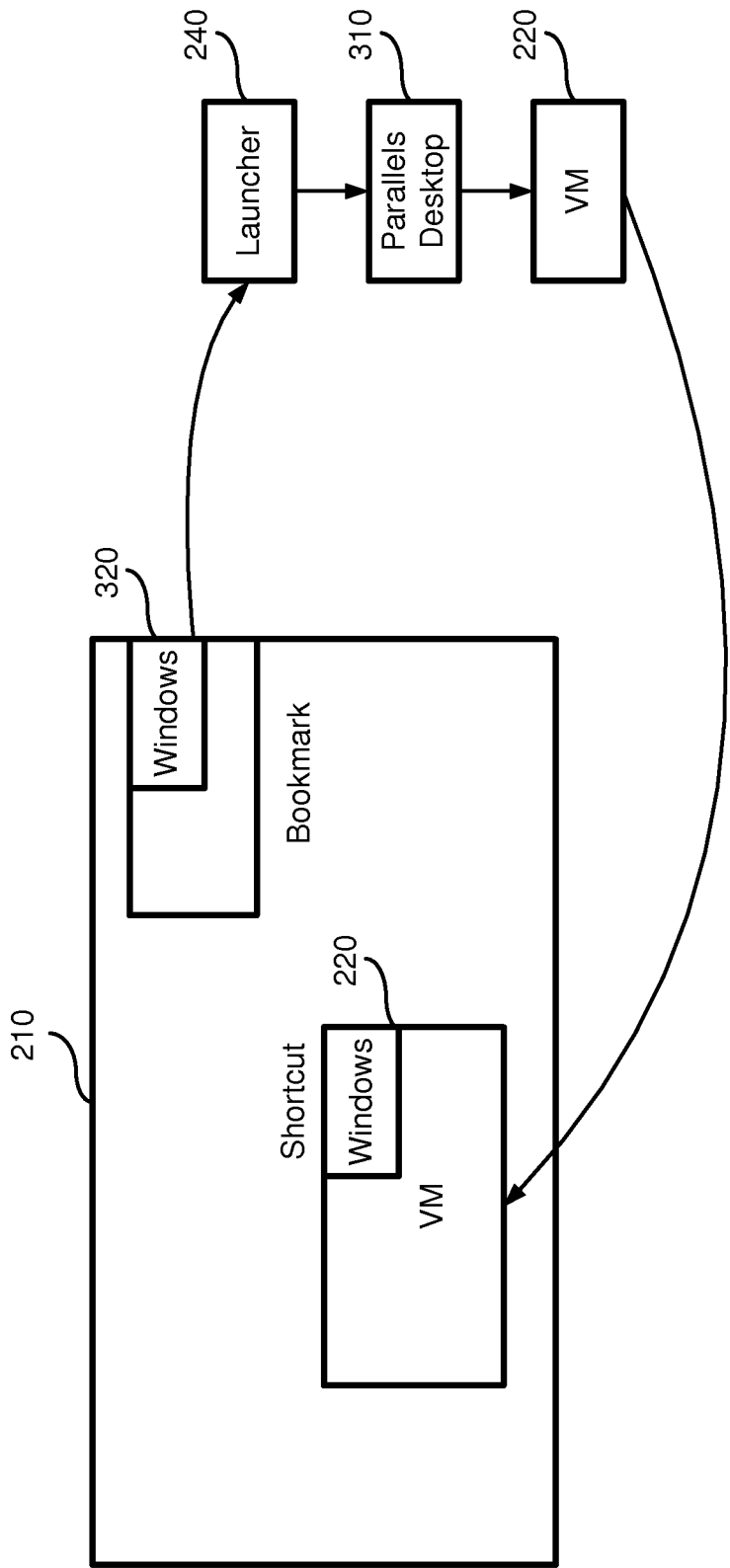
FIG. 3 illustrates a process of using the application bookmarks, in accordance with the exemplary embodiment.

FIG. 3 illustrates a process of using the application bookmarks, in accordance with the exemplary embodiment. The host computer 210 has the VM 220 running on it. The VM 220 runs Windows™ OS. The Windows™ desktop displays an application bookmark 320 (i.e., a shortcut). An application bookmark 320 is clicked on. The application data is provided to the VM 220. The application is opened using launcher 240. If the Parallels™ Desktop 310 is running, an application bookmark 320 is virtualized (via VM 220) on a host desktop 210. Then, the application is launched on the host system 210.

Thus, in one embodiment, the host bookmark contains a number of elements:

1. An icon, where the icon is extracted either from the guest application (or guest OS) or from the guest system registry, where files associations and corresponding actions are stored.

2. A name that is extracted from guest bookmark. For example, the non-native (guest) shortcut of the file may be called AppName, the internal file name may be DeveloperName, the bookmark with link to that file may be called SpecifiedName. Either DeveloperName or the name corresponding to the dragged and dropped icon (bookmark) can be used to invoke the executable file.

3. A command line. The command line contains such items as, for example:

(i) a file data, for example, the file will be edited with the below mentioned application;

(ii) application launcher data, providing possibility so start application inside VM;

(iii) VM launcher data, making it possible to start a specific Guest OS for running a non-native application in that VM or editing a file in that VM;

(iv) Guest OS settings data, detected during the creation of the link to the executable in the VM. For example, the launcher checks and saves Windows Restore Point data for successful start of unknown or possibly unstable application.

The image of the host-side icon can be generated by the VMM for the host desktop by issuing a system call inside the Guest OS, such as GetIcon (or similar API), and then receiving the icon in Guest OS format and converting it to host OS format.

Figure 4:
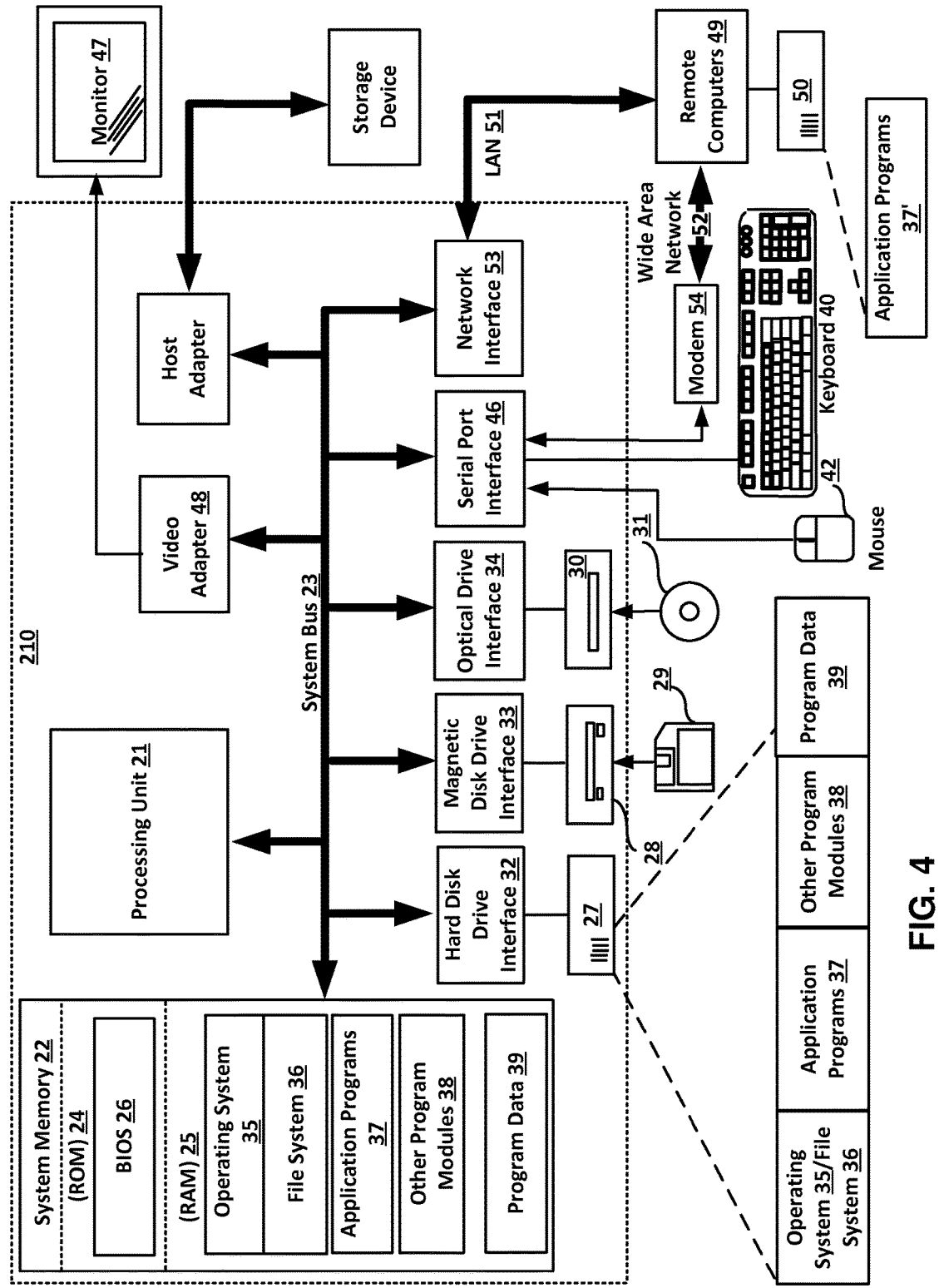
FIG. 4 illustrates a schematic of an exemplary computer system that can be used for implementation of the invention.

With reference to FIG. 4, an exemplary system for implementing the invention includes a general purpose computing device in the form of a computer system 210 or the like including a processing unit 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes read-only memory (ROM) 24 and random access memory (RAM) 25. A basic input/output system 26 (BIOS), containing the basic routines that help transfer information between elements within the computer 104, such as during start-up, is stored in ROM 24.

The computer 210 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide non-volatile storage of computer readable instructions, data structures, program modules and other data for the computer 210.

Although the exemplary environment described herein employs a hard disk, a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk, magnetic disk 29, optical disk 31, ROM 24 or RAM 25, including an operating system 35. The computer 210 includes a file system 36 associated with or included within the operating system 35, one or more application programs 37, other program modules 38 and program data 39. A user may enter commands and information into the computer 210 through input devices such as a keyboard 40 and pointing device 42. Other input devices (not shown) may include a microphone, joystick, game pad, satellite dish, scanner or the like.

These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers.

The computer 210 may operate in a networked environment using logical connections to one or more remote computers 49. The remote computer (or computers) 49 may be another computer, a server, a router, a network PC, a peer device or other common network node, and typically includes many or all of the elements described above relative to the computer 210, although only a memory storage device 50 has been illustrated. The logical connections include a local area network (LAN) 51 and a wide area network (WAN) 52. Such networking environments are commonplace in offices, enterprise-wide computer networks, Intranets and the Internet.

When used in a LAN networking environment, the computer 210 is connected to the local network 51 through a network interface or adapter 53. When used in a WAN networking environment, the computer 210 typically includes a modem 54 or other means for establishing communications over the wide area network 52, such as the Internet.

The modem 54, which may be internal or external, is connected to the system bus 23 via the serial port interface 46. In a networked environment, program modules depicted relative to the computer 210, or portions thereof, may be stored in the remote memory storage device. It will be appreciated that the network connections shown are exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A computer-implemented system for emulation of an application bookmark on a host desktop, the system comprising:

a memory device; and a hardware processor of a host computer system configured to execute a host operating system (OS) with a host desktop and a Virtual Machine (VM) with a guest OS supporting a virtualized desktop, at least one non-native application and at least one non-native application shortcut for the non-native application, wherein the guest OS is a different type of operating system than the host OS and wherein the non-native application is incompatible with the host OS and cannot execute under the host OS;

wherein the processor is further configured to:

generate a native shortcut on the host side when the non-native application shortcut is dragged or copied from the VM to the host side, wherein the native shortcut includes a wrapper representing a first file within a second file, the first file representing the non-native shortcut of the Guest OS and the second file representing the native shortcut visible to the host OS, and wherein the first file includes a source icon file;

generate a host-side native icon on the host desktop, the host-side native icon corresponding to the native shortcut, wherein an image of the host-side native icon is generated by a virtual machine monitor for the host desktop by (i) issuing a system call inside to the guest OS, (ii) receiving from the guest OS a guest icon in a native format of the Guest OS, and (iii) converting the received guest icon to a native format of the host OS, wherein the host-side native icon has an appearance that matches the non-native shortcut instead of a generic icon; and launch the non-native application inside the VM from the host desktop using the host-side native shortcut.

2. The system of claim 1, wherein the VM is launched in order to display the virtualized desktop, and wherein the virtualized desktop contains multiple non-native shortcuts.

3. The system of claim 2, wherein the virtualized desktop is Parallels™ Desktop.

4. The system of claim 1, wherein the host-side native icon is linked to an executable of the non-native application residing on the VM.

5. The system of claim 1, wherein a graphic representation of the nonnative application shortcut is transferred to the host desktop to serve as the host-side icon.

6. The system of claim 1, wherein the processor is further configured to parse the host-side native icon and retrieve service data and VM identifier needed for launching the application corresponding to the non-native application shortcut.

7. The system of claim 1, wherein the host-side native icon contains the non-native application shortcut and a link to the corresponding non-native application residing on the VM.

8. The system of claim 1, wherein the host-side native icon includes an icon image extracted from the non-native application.

9. The system of claim 1, wherein the host-side native icon includes an icon image extracted from a registry of the Guest OS.

10. The system of claim 1, wherein the host-side native icon includes a command line with a name of an application used for editing a file.

11. The system of claim 1, wherein the host-side native icon includes a command line with an identifier of a specific VM used to run the non-native application.

12. The system of claim 1, wherein the host-side native icon includes a command line with an identifier of a launcher in a specific VM used to launch the non-native application.

13. The system of claim 1, wherein the host-side native icon includes Guest OS settings data.

14. The system of claim 1, wherein the host-side native icon includes Guest OS Restore Point data.

15. A computer-implemented method for emulation of a virtual application bookmark on a host desktop, the method comprising:

launching a host operating system (OS) on host computer system;

starting a Virtual Machine (VM) running a guest OS with at least one non-native application and a corresponding non-native application shortcut, wherein the guest OS is a different type of operating system than the host OS and wherein the non-native application is incompatible with the host OS and cannot execute under the host OS;

in a Virtual Machine Monitor, acquiring data of the non-native application shortcut;

generating a host-side native shortcut based on the data of the non-native application shortcut when the non-native application shortcut is dragged or copied from the VM to the host side, wherein the native shortcut includes a wrapper representing a first file within a second file, the first file representing the non-native shortcut of the Guest OS and the second file representing the native shortcut visible to the host OS, and wherein the first file includes a source icon file;

rendering a host icon on a host desktop, wherein an image of the host icon is generated by a virtual machine monitor for the host desktop by (i) issuing a system call inside to the guest OS, (ii) receiving from the guest OS a guest icon in a native format of the Guest OS, and (iii) converting the received guest icon to a native format of the host OS;

linking the host icon to an executable file of the non-native application that resides in the VM, wherein the host icon contains the data of the non-native application shortcut, a graphical image of the non-native application shortcut and a link to the executable file, wherein the host icon has an appearance that matches the non-native shortcut application instead of a generic icon, and wherein the non-native application in the VM is launcheable using the host-side native shortcut.

16. The method of claim 15, further comprising parsing the non-native application shortcut and retrieving service data needed for launching the non-native application.

17. A computer-implemented system for emulation of an application bookmark on a host desktop, the system comprising:

a memory device; and a hardware processor of a host computer system configured to execute a host operating system (OS) with a host desktop and a Virtual Machine (VM) with a guest OS, a non-native application, and a non-native application shortcut for the non-native application;

wherein the processor is further configured to:

generate a native shortcut on the host side when the non-native application shortcut is dragged or copied from the VM to the host side, wherein the native shortcut includes a wrapper representing a first file within a second file, the first file representing the non-native shortcut of the Guest OS and the second file representing the native shortcut, and wherein the first file includes a source icon file; and render an icon for the native shortcut on the host desktop, wherein an image of the icon on the host desktop is generated by a virtual machine monitor for the host desktop by (i) issuing a system call inside to the guest OS, (ii) receiving from the guest OS a guest icon in a native format of the Guest OS, and (iii) converting the received guest icon to a native format of the host OS, and launch the non-native application inside the VM from the host desktop using the host-side native shortcut.

\* \* \* \* \*